July 4, 1950  R. D. ACTON  2,513,906
CONTROL MEANS FOR TRACTOR-CONNECTED IMPLEMENTS
Original Filed March 22, 1944  2 Sheets-Sheet 1

Inventor:
Russel D. Acton.
Paul O. Pippel
Atty.

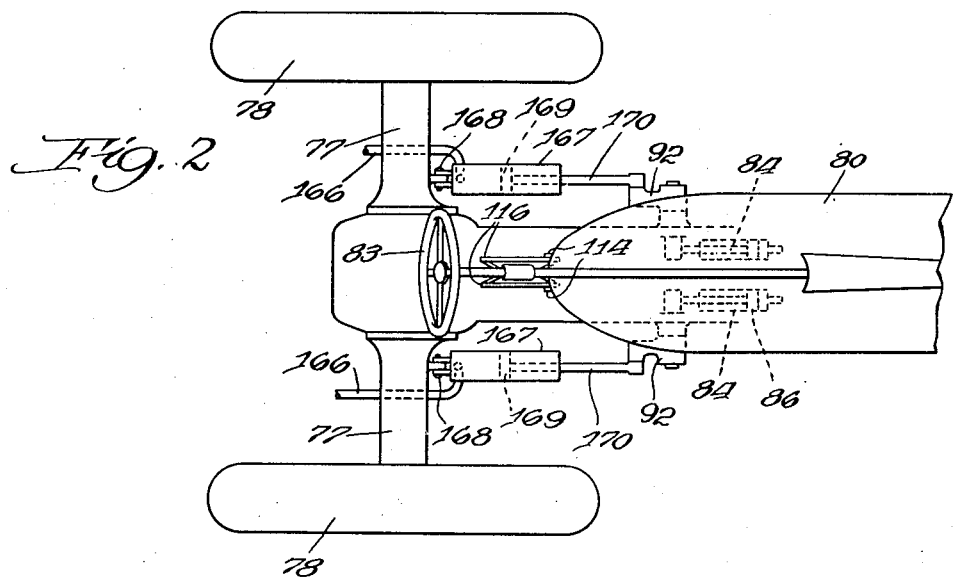
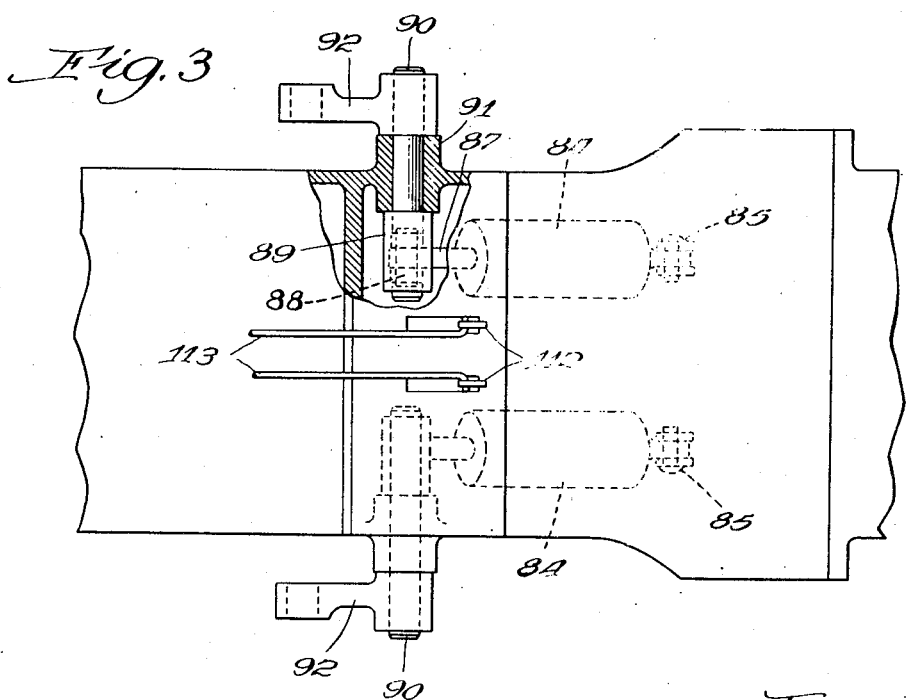

Patented July 4, 1950

2,513,906

UNITED STATES PATENT OFFICE 2,513,906

CONTROL MEANS FOR TRACTOR-CONNECTED IMPLEMENTS

Russel D. Acton, Chicago, Ill., assignor to International Harvester Company, a corporation of New Jersey Original application March 22, 1944, Serial No. 528,672. Divided and this application April 20, 1946, Serial No. 663,714

1 Claim. (Cl. 56—20)

This application is a division of my copending application Serial No. 528,672, filed March 22, 1944, issued November 12, 1946, into Patent No. 2,410,918 and reissued November 11, 1947 into Patent No. Re. 22,932.

The present invention relates to a control means for a tractor-connected implement. More specifically, it relates to fluid-pressure means for controlling or adjusting a tractor-mounted or a trail-behind implement.

It is known to provide a tractor-connected implement with a fluid-power device for adjusting and controlling the implement, the device being actuated by the power of the tractor. With such an arrangement there is normally a hose for fluid running from the tractor to the implement. The disadvantage is that when the implement is disconnected from the tractor the fluid-power means must also be disconnected from the implement or from the tractor or from both, and this normally requires a disconnection of a line or conduit through which fluid is passed. With the break of a fluid line there is considerable danger of loss of the fluid. In the present invention the fluid-power means is removed without breaking of the fluid-carrying line.

An object of the present invention is to provide an improved control means for a tractor-connected implement.

Another object is the provision of a unit type hydraulic power-transmitting device particularly adapted for adjusting a tractor-connected implement from a power lift mechanism.

A further object is the provision of an improved pressure-fluid means for adjusting a trail-behind tractor-connected implement from the tractor.

Another object is to provide a plurality of remote controls for tractor-connected implements whereby structure or elements functioning independently of each other may be separately adjusted.

According to the present invention, a pair of detachable units each comprising a first cylinder with a piston therein, a second cylinder with a piston therein, and a connecting conduit are mounted so that one cylinder of each unit is upon a tractor and the other cylinder is upon or connected to an implement carried by or connected to the tractor. The piston in the cylinder on the tractor is shifted in the cylinder by power derived from the tractor power plant acting through external mechanical means on the tractor. When the implement is to be disconnected from the tractor, the one cylinder is disconnected from the implement, and the disconnection of the cylinder and the piston on the tractor from the source of tractor power is made at the external mechanical means through which power is supplied to the cylinder of the piston. Thus, there is no disconnection through a fluid line, and the disadvantages of such a disconnection are avoided. Moreover a hydraulic or mechanical power-lift mechanism as supplied on many tractors can be utilized to adjust flexibly connected implements with ease and accuracy.

In the drawings:

Figure 2 is a plan view of the tractor shown in Figure 1 with two separate power-lift cylinders indicated in dotted lines; and Figure 3 is an enlarged fragmentary plan view of the central body portion of the tractor shown in Figure 2 and with a portion broken away to expose a rock shaft mounting.

Figure 1:
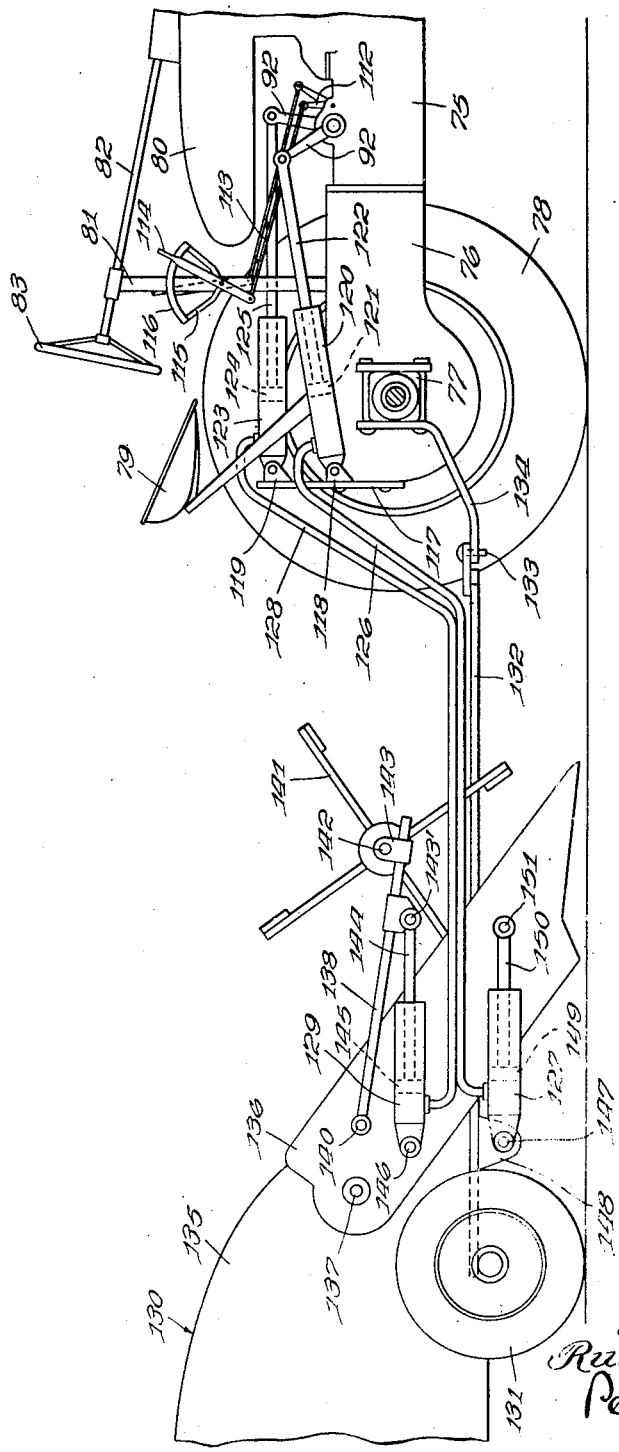
Figure 1 is a side view of a tractor with a harvesting machine attached thereto incorporating a modification of the invention in which two push tool hydraulic devices are utilized.

In the drawings as shown in Figure 1, a tractor is utilized having a double power lifting arrangement as shown in Figures 2 and 3. In said figures, the rock-shafts and the independent cylinders are clearly shown as well as levers and links for effecting independent manual control of either of the lifting arms. The details of the valves are not shown, as this invention is concerned with the transmission of power from the independent lifting arms to implements connected to the tractor. The power lift construction and all the operating elements thereof are disclosed in U. S. Patent No. 2,427,871, issued September 23, 1947.

The tractor includes a narrow central body portion 75 and a rear body portion 76 from which rear axle structures 77 extend. Traction wheels 78 are mounted on axles carried by the axle structures 77. Certain other parts of the tractor are shown including an operator's station 79, a gasoline tank 80, a steering column support 81, a steering column 82, and a steering wheel 83. As indicated by dotted lines in Figures 2 and 3, the central body portion 75 contains a pair of power lifting cylinders 84. Each of said cylinders is pivotally connected to a bracket 85 rigid with respect to the body portion 75. Each of the cylinders, as shown in Figures 3 and 4, is also provided with a conventional piston 86 connected by a piston rod 87 with a crank arm 88 projecting downwardly from and rigid with a sleeve 89. The sleeve 89 is secured to a shaft 90 rotatably mounted in a journal portion 91 formed in the casting of the body portion 75. A power lift arm 92 is connected to each of the shafts 90. It will be understood that the lifting arm 92 may be connected at any angular position on the shaft 90 either extending upwardly or downwardly.

Control levers 112 are respectively associated with the hydraulic rams 84—86 to control the admittance and exhaust of fluid from the ends of the cylinders 84. Each lever 112 is connected by a link 113 with a manually operable lever 114 swingable along a quadrant 116 of a tractor-mounted bracket 115. Swinging of either lever 114 will cause movement of the associated ram plunger 86 a distance and direction correlated with the distance and direction of swinging of such lever. The levers 114 and consequently the ram plungers and the power lift arms 92 are, therefore, independently maneuverable.

Referring to Figure 1, a bracket structure 117 at the rear of the body portion 76 of the tractor extends upwardly including two brackets 118 and 119. An hydraulic cylinder 120 is pivotally connected to the bracket 118, a piston 121 in the cylinder having a piston rod 122 extending from the cylinder and pivotally connected to one of the lifting arms 92. A second cylinder 123 is pivotally connected to the upper bracket 119. A piston 124 in the cylinder 123 has a piston rod 125 extending forwardly to a point of pivotal connection to the second lifting arm 92.

A flexible conduit 126 connected to the cylinder 120 extends rearwardly to a point of connection with a cylinder 127. A flexible conduit 128 extends rearwardly to a point of connection with a cylinder 129. Cylinder 120 serves as a tractor-mounted guide for the piston 121 which constitutes a proximate member reciprocally therein. Cylinder 127 serves as an implement-mounted guide for the piston 149 which constitutes a remote member reciprocally therein. The hose or sheath 126 communicating between the guides 120 and 127 normally contains an oil column which serves as a force-transmitting medium in force-transmitting relation between said proximate and remote members 121—149 and movable lengthwise in said sheath to transmit motion between said members. The terminology just applied to the ram couple 120—121—127—149 and the interconnecting hose 126 correspondingly applies to the ram couple 123—124—129—145 and the interconnecting hose 128.

A harvester thresher illustrated in outline has been shown as being connected to the tractor at the rear thereof. Said harvester thresher, indicated in its entirety by the reference character 130, is carried on supporting wheels provided with rubber tires, one of which 131 is shown in the drawing. A frame structure 132 extending forwardly from the harvester thresher is connected by a pin 133 with a draw-bar structure 134 rigidly secured to the rear axle extension 77 of the tractor. The harvester thresher is conventional in the art and includes principally a thresher part 135 and a harvester part 136 pivotally mounted at 137 on the thresher part. A reel structure includes a frame 138, one side of which shown in the drawing is pivotally connected at 140 to the harvester part 136. A reel 141 is rotatably carried by the frame 138. Said reel is mounted on a shaft 142 journaled in brackets 143 mounted on the forwardly extending portions of the frame 138. A bracket 143', mounted on a portion of the frame structure 138, provides an attachment point for a piston rod 144 connected to a piston 145 mounted in the cylinder 129. The cylinder itself is pivotally connected at 146 to the harvester part 136 at a point spaced from the pivotal connecting point 140 of the reel frame. It will be understood, therefore, that the movement of the piston 145 relative to the cylinder 129 vertically adjusts the reel structure with respect to the harvester part 136. Such adjustment is necessary during the operation of a harvester thresher due to the adjustment of the harvester part which will be hereinafter described and due to the height and type of grain being harvested.

The cylinder 127 is pivotally connected at 147 with a bracket 148 depending downwardly from the draft frame structure 132. A piston 149 in the cylinder 127 is provided with a piston rod 150 which is pivotally connected at 151 with the harvester part 136. It will be understood that any movement of the piston 149 relative to its cylinder 127 will vertically adjust the harvester part 136. This adjustment is necessary in the operation of a harvester thresher and is frequently used during passage through the field due to the variation in the type of grain and the type of undergrowth in the grain.

When an operator is harvesting grain with the tractor implement combination shown in Figure 1, he has at his complete control the vertical adjustment of the reel and the harvester part with respect to the other and with respect to the ground level. Due to the use of flexible conduits 126 and 128, any mechanical connections are avoided, and the pivot point of the draft frame 132 on the tractor relative to controlling mechanism need be given no consideration. Moreover it is unnecessary to extend long and complicated mechanical controls from the trailing implement to the tractor. The operator has at his command, by merely moving the control lever 114, the exact position of the reel with respect to the harvester part 136 and the position of the harvester part 136 with respect to the ground. A tractor having built in power lifting mechanisms may be utilized, the push-pull hydraulic units which make possible the use of mechanical lifting arms being entirely independent from the tractor power lift system.

It will be apparent from the foregoing description that novel means have been devised for controlling either an implement directly connected to a tractor or one pulled therebehind in trailing relation. This means utilizes in combination a hydraulic fluid system complete in itself with a mechanical member forming part of a tractor power lift mechanism. It enables an operator to use a tractor having any type of power lift mechanism in conjunction with an implement which must be controlled during operation of the tractor. The degree of control obtainable depends upon the characteristics of the tractor power lift mechanism. In the power lift construction herein illustrated two power lift mechanisms are provided of the follow-through type in which the operator may manually select the position of the power lift arms with the power lift mechanism following and throwing out automatically when the selective point is reached. This two-unit type of mechanism provides for use of the device of the invention with an implement where it is necessary in order to control the implement to independently adjust two different elements of the implement. Two uses of this arrangement are shown in Figure 1.

The outstanding utility of a device as disclosed in the various modifications is that the hydraulic actuating system may be provided as an attachment which is complete within itself and which does not require connection into the hydraulic system of a hydraulic lift mechanism. Breaking of the fluid conduit or leakage does not affect the tractor power lift mechanism. Moreover these units may be used at different times, on different tractors, and on different implements by merely providing the necessary attaching brackets.

It is the intention to limit the invention only within the scope of the appended claim.

What is claimed is:

In combination, a tractor including independently operable power-actuated members thereon and control elements manipulatable to respectively incur movement of the power-actuated members into selected positions and maintain them in such positions; an implement connected with the tractor, said implement including a frame movable relatively to the tractor and also including a movable part mounted on said frame for movement in complemental relation with respect thereto; a pair of power transmitting units each comprising a flexible sheath, a tractor-mounted guide at one end of such sheath, an implement-mounted guide at the opposite end of such sheath, a proximate member reciprocally in the tractor-mounted guide, a remote member reciprocally in the implement-mounted guide, and a force transmitting medium in the sheath in force transmitting relation between said proximate and remote members and movable lengthwise in the sheath to transmit motion between such members; means detachably connecting one of the proximate members and its guide respectively to and between one of the power-actuated members and another part of the tractor; means detachably connecting the other proximate member and its guide respectively to and between the other power-actuated member and another part of the tractor; means detachably connecting one of the remote members and its guide respectively to and between the implement frame and another part of the implement; and means detachably connecting the other remote member and its guide respectively to and between said movable implement part and said implement frame.

RUSSEL D. ACTON.

REFERENCES CITED

The following references are of record in the file of this patent:

UNITED STATES PATENTS

| Number | Name | Date |
|---|---|---|
| 1,819,605 | Johnston | Aug. 18, 1931 |
| 2,206,656 | Boldt | July 20, 1940 |
| 2,212,465 | Baldwin | Aug. 20, 1940 |
| 2,226,563 | Keith | Dec. 31, 1940 |
| 2,319,458 | Hornish | May 18, 1943 |
| 2,373,450 | Boldt | Apr. 10, 1945 |
| 2,375,912 | Gifford et al. | May 15, 1945 |
| 2,410,918 | Acton | Nov. 12, 1946 |